United States Patent
Yoshioka et al.

(10) Patent No.: US 12,081,339 B2
(45) Date of Patent: Sep. 3, 2024

(54) TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Hiroki Harada, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 338 days.

(21) Appl. No.: 17/596,972

(22) PCT Filed: Jun. 25, 2019

(86) PCT No.: PCT/JP2019/025180
§ 371 (c)(1),
(2) Date: Dec. 22, 2021

(87) PCT Pub. No.: WO2020/261389
PCT Pub. Date: Dec. 30, 2020

(65) Prior Publication Data
US 2022/0321272 A1     Oct. 6, 2022

(51) Int. Cl.
*H04L 1/18* (2023.01)
*H04L 1/08* (2006.01)
*H04L 1/1812* (2023.01)
*H04W 72/0446* (2023.01)

(52) U.S. Cl.
CPC ........... *H04L 1/1812* (2013.01); *H04L 1/08* (2013.01); *H04W 72/0446* (2013.01)

(58) Field of Classification Search
CPC .......... H04W 72/23; H04W 56/009; H04W 72/0446; H04W 84/06; H04W 72/21; H04L 1/1854; H04L 1/1819; H04L 5/0057; H04L 5/0055; H04L 5/14; H04L 5/1469; H04L 5/001; H04L 1/1861; H04L 1/18; H04L 1/0079; H04B 7/2125
See application file for complete search history.

(56) References Cited

U.S. PATENT DOCUMENTS

| | | | | |
|---|---|---|---|---|
| 2014/0211671 A1* | 7/2014 | Choi | ...................... | H04L 5/1469 370/280 |
| 2016/0323071 A1* | 11/2016 | Berggren | .............. | H04L 5/0055 |
| 2017/0331597 A1* | 11/2017 | Ji | .......................... | H04L 1/1854 |

(Continued)

OTHER PUBLICATIONS

International Search Report issued in PCT/JP2019/025180, mailed on Feb. 10, 2020 (3 pages).

(Continued)

*Primary Examiner* — Jung Liu
(74) *Attorney, Agent, or Firm* — Osha Bergman Watanabe & Burton LLP

(57) ABSTRACT

One aspect of a terminal according to the present disclosure includes a receiving section that receives downlink shared channel scheduled by downlink control information, and a control section that determines a feedback timing of transmission confirmation information responding to the downlink shared channel on the basis of information related to a feedback timing notified by at least one of the downlink control information and higher layer signaling, and a reference point configured in a slot where the downlink shared channel is transmitted or subsequent slots.

7 Claims, 10 Drawing Sheets

(56) References Cited

U.S. PATENT DOCUMENTS

| | | | | |
|---|---|---|---|---|
| 2019/0296863 A1* | 9/2019 | Hu | .................. | H04W 72/23 |
| 2020/0274646 A1* | 8/2020 | Du | .................. | H04L 1/1896 |
| 2021/0058949 A1* | 2/2021 | Kim | .................. | H04W 16/14 |
| 2021/0321353 A1* | 10/2021 | Muruganathan | ...... | H04W 72/23 |
| 2021/0352745 A1* | 11/2021 | Yang | .................. | H04W 72/04 |

OTHER PUBLICATIONS

Written Opinion of the International Searching Authority issued in PCT/JP2019/025180, mailed on Feb. 10, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Samsung; "Summary of Draft CRs on CA and HARQ-ACK Codebook for Rel-15 NR"; 3GPP TSG RAN WG1 #97, R1-1907664; Reno, USA, May 13-17, 2019 (6 pages).

* cited by examiner

| SUBCARRIER SPACING | 15kHz | 30kHz | 60kHz | 120kHz | 240kHz | 480kHz | 960kHz |
|---|---|---|---|---|---|---|---|
| SYMBOL DURATION | 66.6 $\mu s$ | 33.3 $\mu s$ | 16.65 $\mu s$ | 8.325 $\mu s$ | 4.1625 $\mu s$ | 2.0812 $\mu s$ | 1.0406 $\mu s$ |

FIG. 2

| PDSCH-TO-HARQ TIMING INDICATOR | | | NUMBERS OF SLOTS k (NUMBER OF SLOTS k) |
|---|---|---|---|
| 1 BIT | 2 BITS | 3 BITS | |
| 0 | 00 | 000 | 1st value provided by dl-DataToUL-ACK |
| 1 | 01 | 001 | 2nd value provided by dl-DataToUL-ACK |
| | 10 | 010 | 3rd value provided by dl-DataToUL-ACK |
| | 11 | 011 | 4th value provided by dl-DataToUL-ACK |
| | | 100 | 5th value provided by dl-DataToUL-ACK |
| | | 101 | 6th value provided by dl-DataToUL-ACK |
| | | 110 | 7th value provided by dl-DataToUL-ACK |
| | | 111 | 8th value provided by dl-DataToUL-ACK |

FIG. 5

| PDSCH-TO-HARQ TIMING INDICATOR | | | | NUMBERS OF SLOTS k (NUMBER OF SLOTS k) |
|---|---|---|---|---|
| 1 BIT | 2 BITS | 3 BITS | 4 BITS | |
| 0 | 00 | 000 | 0000 | 1st value provided by dl-DataToUL-ACK |
| 1 | 01 | 001 | 0001 | 2nd value provided by dl-DataToUL-ACK |
|  | 10 | 010 | 0010 | 3rd value provided by dl-DataToUL-ACK |
|  | 11 | 011 | 0011 | 4th value provided by dl-DataToUL-ACK |
|  |  | 100 | 0100 | 5th value provided by dl-DataToUL-ACK |
|  |  | 101 | 0101 | 6th value provided by dl-DataToUL-ACK |
|  |  | 110 | 0110 | 7th value provided by dl-DataToUL-ACK |
|  |  | 111 | 0111 | 8th value provided by dl-DataToUL-ACK |
|  |  |  | 1000 | 9th value provided by dl-DataToUL-ACK |
|  |  |  | 1001 | 10th value provided by dl-DataToUL-ACK |
|  |  |  | 1010 | 11th value provided by dl-DataToUL-ACK |
|  |  |  | 1011 | 12th value provided by dl-DataToUL-ACK |
|  |  |  | 1100 | 13th value provided by dl-DataToUL-ACK |
|  |  |  | 1101 | 14th value provided by dl-DataToUL-ACK |
|  |  |  | 1110 | 15th value provided by dl-DataToUL-ACK |
|  |  |  | 1111 | 16th value provided by dl-DataToUL-ACK |

FIG. 6

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, 3GPP Rel. 8 to Rel. 14), a terminal (for example, a user terminal (UE (User Equipment))) controls a reception of a downlink shared channel (for example, PDSCH (Physical Downlink Shared Channel)) on the basis of downlink control information (DCI, also referred to as a DL assignment or the like)) from a base station. The user terminal also controls a transmission of an uplink shared channel (for example, PUSCH (Physical Uplink Shared Channel)) on the basis of DCI (also referred to as a UL grant or the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR in Rel. 16 or later versions), a study is underway to use a frequency band or frequency range (FR) above a certain frequency (for example, 52.6 GHz).

It is assumed that the frequency band above the certain frequency increases in phase noise, and has high sensitivity to a ratio of peak power to average power PAPR (Peak-to-Average Power Ratio). Accordingly, in a frequency band above the certain frequency, subcarrier spacing (SCS) is assumed to widen. In a case that the subcarrier spacing widens, at least one of a symbol duration and a slot duration is considered to shorten more.

In NR, it is assumed that at least one of a higher layer parameter and the DCI is used to specify to the UE a value indicating a transmission timing of transmission confirmation information responding to a DL signal (for example, PDSCH) (the information is also referred to as Hybrid Automatic Repeat reQuest-ACKnowledgement (HARQ-ACK), ACKnowledgement/Non-ACKnowledgement (ACK/NACK), A/N, or the like) (the timing is also the referred to as an HARQ-ACK timing value or the like).

However, in the case that at least one of the symbol duration and the slot duration shortens, if transmission timing control on the HARQ-ACK or the like used in the existing systems (for example, Rel. 15) is adopted without change, HARQ-ACK feedback may not be appropriately performed.

As such, an object of the present disclosure is to provide a terminal and a radio communication method capable of appropriately transmitting transmission confirmation information even in a case of using a high frequency band.

Solution to Problem

A terminal according to an aspect of the present disclosure includes a receiving section that receives downlink shared channel scheduled by downlink control information; and a control section that determines a feedback timing of transmission confirmation information responding to the downlink shared channel on the basis of information related to a feedback timing notified by at least one of the downlink control information and higher layer signaling, and a reference point configured in a slot where the downlink shared channel is transmitted or subsequent slots.

Advantageous Effects of Invention

According to an aspect of the present disclosure, the transmission confirmation information can be appropriately transmitted even in the case of using the high frequency band.

BRIEF DESCRIPTION OF DRAWINGS

FIG. 2 is a diagram to show an example of a symbol duration corresponding to a subcarrier spacing;

FIG. 5 is a diagram to show an example of a table used to notify an HARQ feedback timing by use of DCI and a higher layer;

FIG. 6 is a diagram to show an example of a table used to notify an HARQ feedback timing by use of DCI and a higher layer;

DESCRIPTION OF EMBODIMENTS (FR)

For NR, a study has been underway to use a frequency band of up to 52.6 GHz. For NR in Rel. 16 or later versions, a study is underway to use a frequency band above 52.6

GHz. Note that the frequency band may be interpreted as a range of frequency (a frequency range (FR)) as appropriate.

Figure 1:
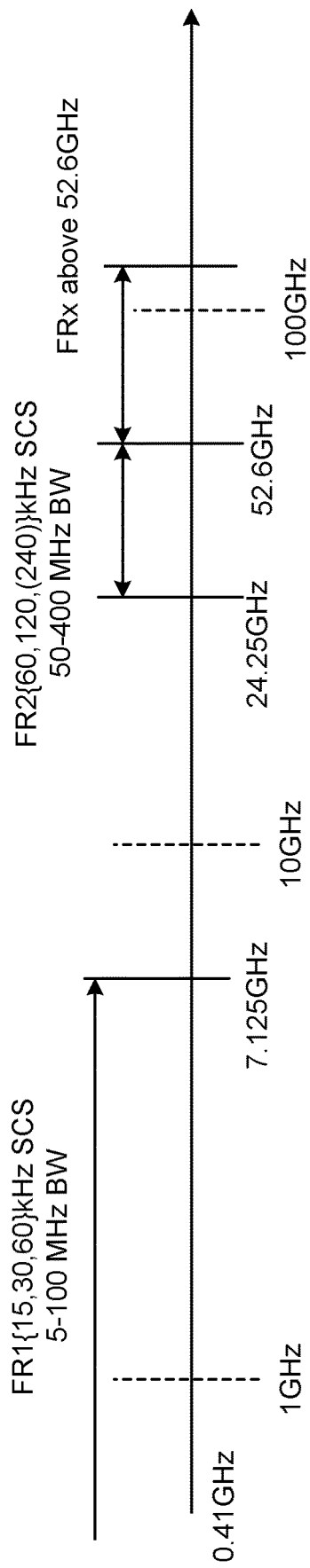
FIG. 1 is a diagram to show an example of an FR.

FIG. 1 is a diagram to show an example of the FR. As shown in FIG. 1, an FR as a target (FRx (x represents any character string)) is, for example, from 52.6 GHz to 114.25 GHz. Note that a frequency range in NR includes FR 1 of 410 MHz to 7.152 GHz, and FR 2 of 24.25 GHz to 52.6 GHz. A frequency range above 52.6 GHz (for example, 52.6 GHz to 114.25 GHz) may be referred to as FR 4.

In the frequency band above 52.6 GHz, it is assumed that the phase noise increases and that a propagation loss increases. At least one of a ratio of peak power to average power PAPR (Peak-to-Average Power Ratio) and a non-linearity PA is assumed to have high sensitivity.

In consideration of the matters described above, in the frequency band above 52.6 GHz (or a waveform for above 52.6 GHz), a configuration having a wider subcarrier spacing (for example, at least one of CP-OFDM and DFT-S-OFDM) is conceivable.

For example, in a case that in the high frequency band, the subcarrier spacing widens while maintaining the number of symbols constituting one slot (for example, 14 symbols/1 slot), at least one of a symbol duration, a CP duration, and a slot duration is assumed to shorten (see FIG. 2).

FIG. 2 is a diagram to show an example of the symbol duration in each subcarrier spacing. In FIG. 2, 15 kHz, 30 kHz, 60 kHz, 120 kHz, 240 kHz, 480 kHz, and 960 kHz are used as examples of a subcarrier spacing, but other subcarrier spacings may be defined. Values shown in FIG. 2 are examples, without limitation.

(HARQ-ACK Feedback)

For NR, a mechanism is under study that the UE feeds back (reports, transmits, or the like, in other words) the transmission confirmation information (HARQ-ACK) responding to a downlink shared channel (PDSCH).

For example, in NR, a value of a certain field in the DCI used for scheduling of a PDSCH (for example, DCI format 1_0 or 1_1) indicates a feedback timing of an HARQ-ACK responding to the PDSCH. In a case that the UE transmits, in slot #n+k, an HARQ-ACK responding to a PDSCH received in slot #n, the value of the certain field may be mapped with a value of k. The certain field is referred to as, for example, a PDSCH-HARQ feedback timing indicator (PDSCH-to-HARQ_feedback timing indicator) field or the like.

In NR, on the basis of a value of a certain field in the DCI used for scheduling of a PDSCH (for example, DCI format 1_0 or 1_1), a PUCCH resource used for feedback of an HARQ-ACK responding to the PDSCH is determined. The certain field may be referred to as, for example, a PUCCH resource indicator (PRI) field, an ACK/NACK resource indicator ((ARI) field, or the like. A value of the certain field may be referred to as a PRI, an ARI, or the like.

A PUCCH resource mapped to each value of the certain field may be configured in advance for the UE by the higher layer parameters. The higher layer parameters may include, for example, "ResourceList" in "PUCCH-ResourceSet" that is a Radio Resource Control (RRC) information element (IE). Note that the RRC IE may be referred to as an RRC parameter or the like. The PUCCH resource may be configured for the UE per set (PUCCH resource set) including one or more PUCCH resources.

In the existing systems (for example, in Rel. 15), in a case of using DCI format 1_0 (also referred to as fallback DCI), 1 to 8 are supported as values (k) of the PDSCH-HARQ feedback timing.

As described above, in the high frequency band, it is assumed that the subcarrier spacing configured to widen causes the symbol duration and slot duration to shorten. In such a case, if the transmission timing control on an HARQ-ACK (for example, a feedback timing value of an HARQ-ACK) similar to that in the existing systems (for example, Rel. 15) is adopted without change, the HARQ-ACK feedback may not be appropriately performed.

For example, in a case that an HARQ-ACK feedback timing value (for example, k=1) the same as that in the existing systems is notified in a high frequency band with a short symbol duration and slot duration, the UE (for example, UE low in a processing capability) may not appropriately perform the HARQ-ACK feedback.

The inventors of the present invention focused on an issue that an HARQ-ACK feedback timing value different from that in the existing systems needs to be supported in a frequency band above a certain frequency (for example, 52.6 GHz), and came up with the idea of the invention related to the present application.

Hereinafter, embodiments according to the present disclosure will be described in detail with reference to the drawings. Note that the following aspects may be used individually, or at least two thereof may be combined and applied.

Note that in the following descriptions, a case of adopting the embodiments in the FR x described above (for example, a certain frequency range above 52.6 GHz (for example, FR 4)) is shown, but the embodiments can be adopted in the existing FR 1 and FR 2, or other frequency ranges.

(First Aspect)

In a first aspect, a case will be described in which at least one of a certain reference point and offset is adopted in the feedback timing control on the HARQ-ACK responding to the DL transmission (for example, PDSCH).

A reference point is configured to be a reception timing of the DL transmission or later with respect to a feedback timing (for example, PDSCH-HARQ feedback timing) notified from a network (for example, a base station). The reference point corresponds a point as a reference of the feedback timing notified from the base station, and for example, may be at least one of a slot and a symbol.

For example, assume a case that the UE receives the DCI scheduling a PDSCH (for example, DCI format 1_0, or DCI format 1_1). In such a case, the UE determines an actual feedback timing on the basis of a reference point configured in a slot after a slot where the PDSCH is transmitted, and the feedback timing value (k) notified by the DCI. The feedback timing value (k) may be referred to as a slot timing value.

The reference point may be determined on the basis of an offset in a time direction (for example, an offset in units of slot or units of symbol). The offset ($k_{offset}$ or k_offset) may be predefined by a specification, or may be notified to the UE from the network by using at least one of the higher layer signaling or the DCI.

The UE may determine the HARQ-ACK feedback timing by adding the offset ($k_{offset}$) to the HARQ-ACK feedback timing value (k) notified by using at least one of the DCI and the higher layer signaling. For example, in a case that the UE receives a PDSCH in slot #n, and a feedback timing value included in the DCI scheduling the PDSCH is k, the UE feeds back an HARQ-ACK in a slot corresponding to slot #n+k+$k_{offset}$. In this case, the reference point corresponds to slot #n+$k_{offset}$.

The offset ($k_{offset}$) may be configured to be longer than a PDSCH processing procedure time N1 for each subcarrier spacing. The processing procedure time (or processing time)

may be a duration from after the end of the last symbol of the PDSCH transmitting a transport block to an uplink (UL) symbol. The UE may provide valid transmission confirmation information (for example, HARQ-ACK)) in a symbol the same as or after the UL symbol.

Alternatively, the offset ($k_{offset}$) may be configured to a time (or a value) the same as the PDSCH processing procedure time N1 for each subcarrier spacing. This allows the HARQ-ACK feedback timing to be configured in a range of UE processing capability.

Figure 3:
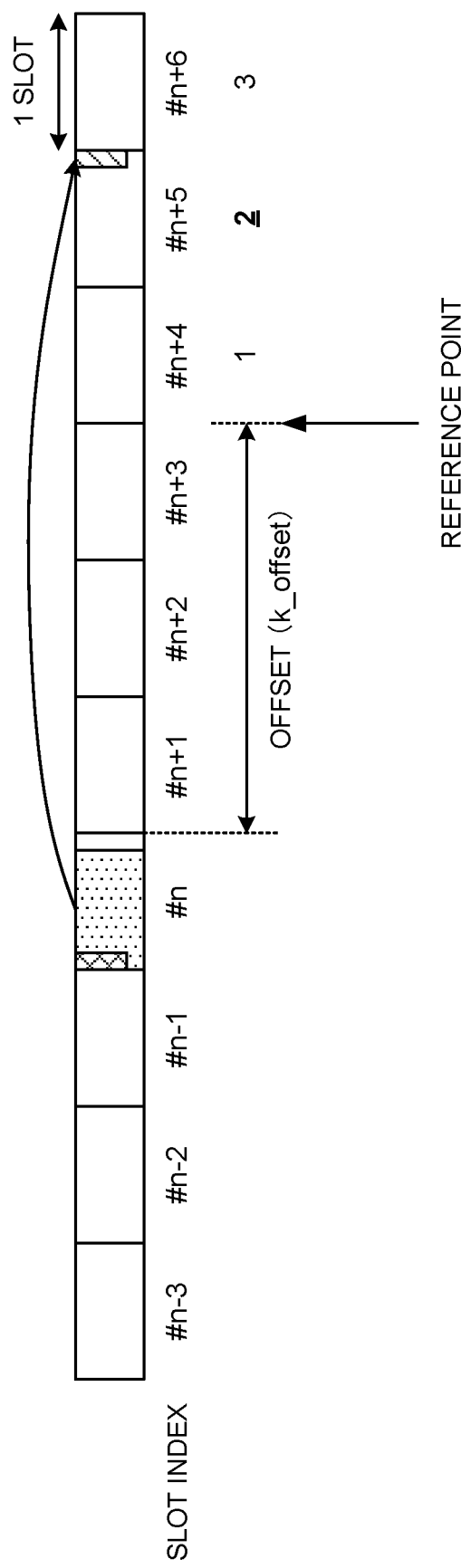
FIG. 3 is a diagram to show an example of feedback control on HARQ-ACK.

FIG. 3 shows an example of a case that the HARQ-ACK feedback is performed on the basis of a reference point configured in a slot after a slot in which a PDSCH (or a PDCCH) is received. Here, a case is shown in which a PDSCH is scheduled in slot #n by a PDCCH (for example, DCI format 1_0) transmitted in slot #n. FIG. 3 shows a case that the HARQ feedback timing value (k) notified by the DCI is 2, and the offset ($k_{offset}$) is 3. Of course, the values of k and $k_{offset}$ are not limited to these values.

The UE feeds back an HARQ-ACK in a slot corresponding to slot #(n+$k_{offset}$ (=3)+k (=2)). In this manner, the offset is used to configure the reference point (here, slot #(n+$k_{offset}$ (=3)), which allows the actual feedback timing in the case that the HARQ feedback timing value (k) notified by the DCI is 2 to be slot #n+5.

According such configuration, the feedback timing of the HARQ-ACK can be configured more than 8 slots after as the HARQ-ACK feedback timing value (k) even in the case that the values (for example, 1 to 8) in the existing systems (for example, Rel. 15) are adopted. As a result, even in a case that the symbol duration and slot duration are shorter than those in the existing systems, the duration from the reception timing of the PDSCH to the transmission timing of the HARQ-ACK can be configured to be long, and thus, increase in a processing load on the UE can be suppressed.

<Variation>

Figure 4:
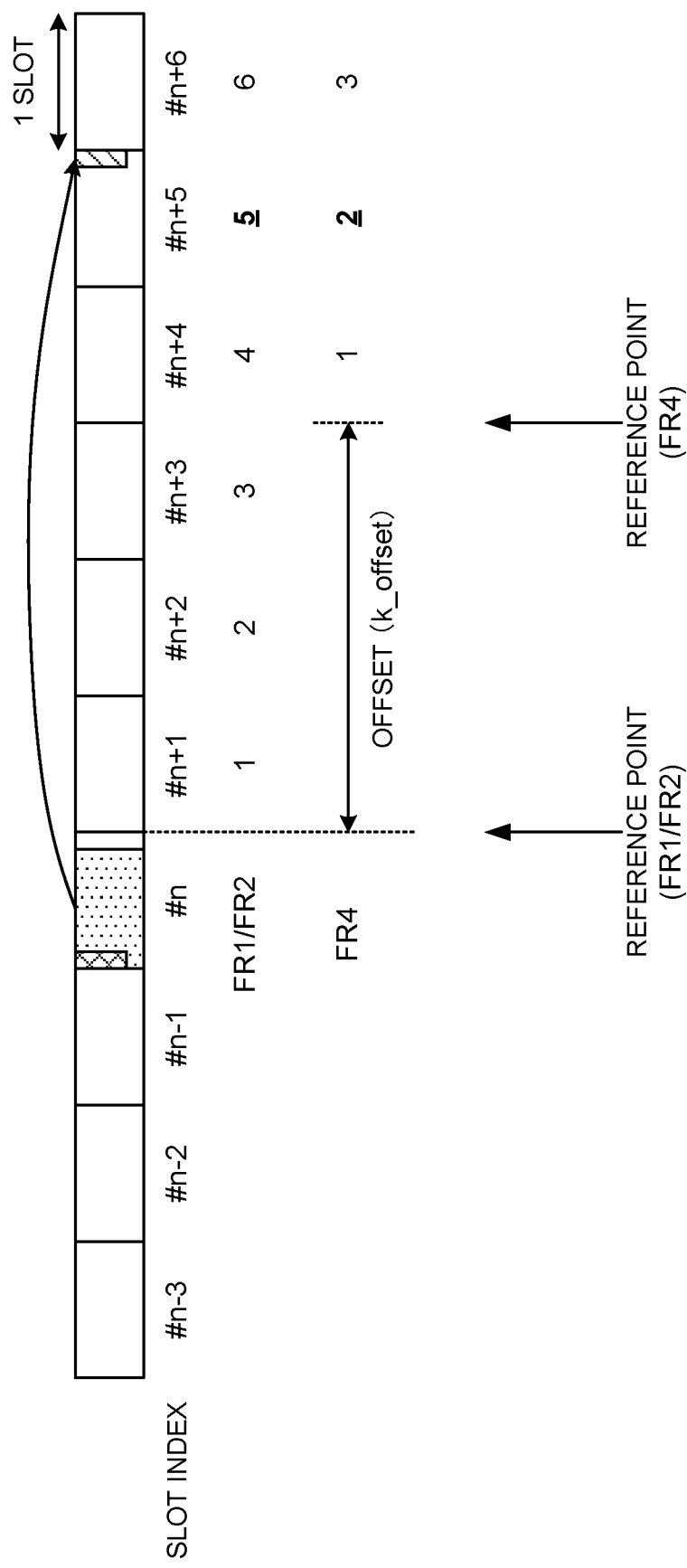
FIG. 4 is a diagram to show another example of the feedback control on HARQ-ACK.

The reference point applied for the HARQ feedback may be configured separately depending on at least one of the frequency range and the subcarrier spacing (see FIG. 4). For example, the UE determines the HARQ-ACK feedback timing in at least one of FR 1 and FR 2 by use of the reception timing of the PDCCH or the PDSCH (for example, reception slot #n) as the reference point. On the other hand, the UE may determine the HARQ-ACK feedback timing in FR 4 by use of a slot (for example, slot #n+1 or after) different from the reception timing of the PDSCH (for example, reception slot #n) as the reference point.

For example, in a case that slot #n+5 is specified as an HARQ feedback timing, the HARQ feedback timing (k=5) is notified to the UE in FR 1 or FR 2 by using the DCI or the like similarly to the existing systems. On the other hand, a value except for the offset ($k_{offset}$) as the HARQ feedback timing (k=2) may be notified to the UE in FR 4 by using the DCI or the like.

In this manner, the configurations of the reference points are separately controlled on the basis of the frequency range (or at least one of the subcarrier spacing, the symbol duration, and the slot duration), which allows the feedback timing to be flexibly configured even in the case that the feedback timing values are common (for example, k=1 to 8).

A case is also assumed that an HARQ feedback corresponding to data (for example, transport block, PDCCH, PDSCH) transmitted in a cell using at least one of a certain frequency range and a certain subcarrier spacing is performed in at least one of a different frequency range and a different subcarrier spacing. In such a case, the reference point may be determined on the basis of at least one of the frequency range and the subcarrier spacing of the cell where the data is transmitted, or may be determined on the basis of at least one of the frequency range and the subcarrier spacing of the cell where the HARQ feedback is performed.

For example, in the case that slot #n+5 is specified as an HARQ feedback timing, when an HARQ feedback of data transmission in FR 4 is performed in FR 1 or FR 2, the HARQ feedback timing (k=5) is notified to the UE by using the DCI or the like similar to the existing systems. On the other hand, in a case that an HARQ feedback of data transmission in FR 1 or FR 2 is performed in FR 4, a value except for the offset ($k_{offset}$) may be notified to the UE as the HARQ feedback timing (k=2) by using the DCI or the like.

In the first aspect, the controlling of the reference point for the HARQ feedback timing allows the actual feedback timing to be shifted afterward without increasing a size of the feedback timing field even in the case of using the feedback timing value (k) the same as in the existing systems.

(Second Aspect)

In a second aspect, a case will be described in which the available HARQ feedback timing value (k) is configured separately per frequency range (or at least one of subcarrier spacing, symbol duration, and slot duration) in the feedback timing control on the HARQ-ACK responding to the DL transmission (for example, PDSCH). Note that the following description describes a case that a value specified by the HARQ feedback indicator field is configured per frequency range, but the frequency range may be interpreted as at least one of the subcarrier spacing, the symbol duration, and the slot duration.

A value of an HARQ feedback indicator field used in a first frequency range and a value of an HARQ feedback indicator field used in a second frequency range where frequencies are higher than the first frequency range may be configured differently from each other. A size of the HARQ feedback indicator field used in the first frequency range and a size of the HARQ feedback indicator field used in the second frequency range may be configured differently from each other.

The UE may determine the slot timing value k specified by the HARQ timing indicator field on the basis of a frequency range configured for a certain cell where a PUCCH is transmitted (or a PUCCH is configured). The certain cell may be at least one of a PCell and a PUCCH-SCell.

For example, in a case that a certain cell is configured with the second frequency range, a slot timing value k specified by the HARQ timing indicator field may be X times the slot timing value k specified by the HARQ timing indicator field in the first frequency range. X is any value of an integer, for example, X may be two (X=2), or X may be three (X=3) or more. The value of X may be determined on the basis of the number of PUCCH repetition transmissions.

For example, in a case that the slot timing value notified by use of DCI format 1_0 in the first frequency range falls within from 1 to 8, the slot timing value notified by used of DCI format 1_0 in the second frequency range may be configured to fall within 2 to 16.

Alternatively, in the case that a certain cell is configured with the second frequency range, a slot timing value k specified by the HARQ timing indicator field may be a value obtained by adding a certain offset value to the slot timing value k specified by the HARQ timing indicator field in the first frequency range.

<Notification by DCI>

Assume a case that the HARQ timing indicator field is notified by use of a first DCI format (for example, DCI format 1_0). In this case, when a certain cell is configured with the first frequency range, a value specified by the HARQ timing indicator field in the first DCI format may be selected from among {1, 2, 3, 4, 5, 6, 7, 8}. On the other hand, when a certain cell is configured with the second frequency range, the value specified by the HARQ timing indicator field in the first DCI format may be selected from among {4, 5, 6, 7, 8, 9, 10, 11}. In this case, the certain offset value is 3, but the offset value is not limited to this value. In the case that a certain cell is configured with the second frequency range, the first DCI format may be DCI format 1_0, or another DCI format.

Alternatively, the configuration may be such that a size of the HARQ timing indicator field in the case that a certain cell is configured with the first frequency range (for example, 3 bits) is different from a size of the HARQ timing indicator field in the case that a certain cell is configured with the second frequency range (for example, the number of bits above 3 bits). For example, the configuration may be such that {1, 2, 3, 4, 5, 6, 7, 8} is specified by use of the HARQ timing indicator field in the case that a certain cell is configured with the first frequency range, and {1, 2, 3, 4, 5, 6, 7, 8, 9, 10, 11, 12, 13, 14, 15, 16} is specified by used of the HARQ timing indicator field in the case that a certain cell is configured with the second frequency range.

<Notification by DCI+Higher Layer (RRC)>

Assume a case that the HARQ timing indicator field is notified by use of a second DCI format (for example, DCI format 1_1). In this case, the base station specifies candidates for the HARQ feedback timing value (or slot timing value) or set of the HARQ feedback timing values (or slot timing values) by use of higher layer signaling, and specifies a specific HARQ feedback timing value by use of the DCI. In this case, the base station may notify the number of bits of the HARQ timing indicator field as any of 1 to 3. In the case that a certain cell is configured with the second frequency range, the second DCI format may be DCI format 1_1 or another DCI format.

In the case that a certain cell is configured with the first frequency range, up to eight candidates may be configured from among integer values (0, . . . , 15) for the feedback timing candidates configured through higher layer signaling (for example, dl-DataToUL-ACK). On the other hand, in the case that a certain cell is configured with the second frequency range, up to eight candidates may be configured from among integer values (for example, 4, . . . , 30) for the feedback timing candidates configured through higher layer signaling (for example, dl-DataToUL-ACK) (see FIG. 5).

FIG. 5 shows an example of a table in which the feedback timing candidate is defined for each number of bits (here, 1 bit, 2 bits, and 3 bits). The candidate value configured through higher layer signaling may be configured to a different value per frequency range.

The UE selects a specific candidate on the basis of bit information included in the HARQ feedback timing field in the DCI. In this case, the UE may assume that the candidate values for the feedback timing are different from each other on the basis of the frequency range for transmitting the HARQ-ACK (for example, the frequency range to which the cell performing the PUCCH transmission belongs).

Alternatively, in the case that a certain cell is configured with the second frequency range (for example, FR 4), up to 16 candidates may be configured from among integer values (for example, 4, . . . , 30) for the feedback timing candidates configured through higher layer signaling (see FIG. 6). Specifically, the maximum numbers of candidates for the configured feedback timing (or the maximum number of bits of the HARQ feedback timing field) may be differently configured on the basis of the frequency range configured for the certain cell.

The UE may assume that the maximum number of bits of the HARQ feedback timing field is different per frequency range for transmitting the HARQ-ACK (for example, the frequency range to which the cell performing the PUCCH transmission belongs).

In this manner, the separately controlling of at least one of the feedback timing value (k) and the feedback timing candidate on the basis of the frequency range (or at least one of the subcarrier spacing, the symbol duration, and the slot duration) allows the feedback timing to be flexibly configured per frequency range.

In the second aspect, the separately controlling of the HARQ feedback timing value (k) allows the actual feedback timing to be shifted afterward without increasing a size of the feedback timing field even in the case of using the feedback timing field the size of which is the same as that in the existing systems.

(Third Aspect)

In a third aspect, generation of an HARQ-ACK bit in a frequency range equal to or above a certain frequency will be described.

<HARQ-ACK Codebook>

In NR, one or more HARQ-ACKs may be mapped to an HARQ-ACK codebook, and the HARQ-ACK codebook may be transmitted on a PUCCH resource indicated by a certain DCI (for example, the last DCI).

The HARQ-ACK codebook may be configured to include an HARQ-ACK bit in a unit of at least one of a time domain (for example, slot), a frequency domain (for example, component carrier (CC)), a spatial domain (for example, layer), a transport block (TB), and a group of code blocks constituting a TB (for example, code block group (CBG)). Note that the CC is also referred to as a cell, a serving cell, a carrier, or the like. That bit is also referred to as an HARQ-ACK bit, HARQ-ACK information, HARQ-ACK information bit, or the like.

The HARQ-ACK codebook is also referred to as a PDSCH-HARQ-ACK codebook (pdsch-HARQ-ACK-Codebook), a codebook, an HARQ codebook, an HARQ-ACK size, or the like.

The number of bits included in (or size of) the HARQ-ACK codebook and the like may be semi-statically or dynamically determined. The HARQ-ACK codebook the size of which is semi-statically determined is also referred to as a semi-static HARQ-ACK codebook, a type-1 HARQ-ACK codebook, a semi-static codebook, or the like. The HARQ-ACK codebook the size of which is dynamically determined is also referred to as a dynamic HARQ-ACK codebook, a type-2 HARQ-ACK codebook, a dynamic codebook, or the like.

Which is used the semi-static HARQ-ACK codebook or dynamic HARQ-ACK codebook may be configured for the UE by the higher layer parameters (for example, pdsch-HARQ-ACK-Codebook).

In the case of the semi-static HARQ-ACK codebook, the UE may feed back the HARQ-ACK bit corresponding to a certain range regardless of presence or absence of scheduling of a PDSCH in the certain range. The certain range is also referred to as an HARQ-ACK window, an HARQ-ACK bundling window, an HARQ-ACK feedback window, a bundling window, a feedback window, or the like.

The semi-static HARQ-ACK codebook may be determined on the basis of at least one of parameters of a) to d) below:

a) a value $K_1$ indicating a timing of an HARQ-ACK (HARQ-ACK timing value), b) a table (a PDSCH time domain resource allocation (RA)) table used to determine a time domain resource allocated to a PDSCH, c) in a case that subcarrier spacings different between the downlink and the uplink are configured, a ratio 2 between a subcarrier spacing configuration $\mu_{DL}$ of the downlink (or downlink BWP) and a subcarrier spacing configuration $\mu_{UL}$ of the uplink (or uplink BWP) to the power of $(\mu_{DL}-\mu_{UL})$ raised, and d) a cell-specific TDD UL/DL configuration (for example, TDD-UL-DL-ConfigurationCommon), and a slot-specific configuration (for example, TDD-UL-DL-ConfigDedicated) overwriting the cell-specific TDD UL/DL configuration.

Specifically, the UE may determine a set of candidate PDSCH reception occasions $M_{A,\,c}$ capable of transmitting an HARQ-ACK bit in a PUCCH transmitted in slot #n in a serving cell c (or active downlink BWP and uplink BWP in the serving cell c) on the basis of at least one of the parameters described above.

On the other hand, in the case of the dynamic HARQ-ACK codebook, the UE may determine the dynamic HARQ-ACK codebook on the basis of presence or absence of a PDSCH in the HARQ-ACK window described above. For example, the dynamic HARQ-ACK codebook may be determined on the basis of a value of a certain field (for example, a downlink assignment index (DAI) field) in the DCI.

The value of the DAI field in the DCI may indicate a counter DAI, or a counter DAI and a total DAI. The counter DAI may indicate a count value of PDSCH allocated before a target time. The total DAI may indicate the total number of PDSCHs transmitted before a target time in the HARQ-ACK window.

For example, a value of a certain bit in the DAI field in the DCI (for example, the certain number of least significant bits (LSBs)) may indicate the counter DAI, and a value of the rest of the bits in the DAI field (for example, the certain number of most significant bits (MSBs)) may indicate the total DAI.

The UE may receive information indicating whether to use the semi-static HARQ-ACK codebook or the dynamic HARQ-ACK codebook as described above (type information, for example, a Radio Resource Control (RRC) parameter "pdsch-HARQ-ACK-Codebook"). Note that the RRC parameter may be referred to as an RRC information element (IE).

Specifically, the UE may receive the type information per group including one or more cells. A PUCCH may be transmitted in one cell in the group. The group may be referred to as a cell group, a master cell group (MCG), a secondary cell group (SCG), a PUCCH group, a PUCCH cell group, or the like.

The cell may be interchangeably interpreted as a serving cell, a carrier, a component carrier (CC), or the like. The cell in which the PUCCH is transmitted may be referred to as a special cell (SpCell) primary cell (PCell), a primary secondary cell (PSCell), a PUCCH cell, or the like.

The UE may include an HARQ-ACK responding to a PDSCH received in one or more CCs in the cell group within a certain period in an HARQ-ACK codebook of a type configured for the cell group (for example, a semi-static HARQ-ACK codebook (type 1) or a dynamic HARQ-ACK codebook (type 2)).

As described above, in the existing systems (for example, Rel. 15), the UE uses the semi-static HARQ-ACK codebook or the dynamic HARQ-ACK codebook to transmit the HARQ-ACK.

As described above in the first aspect and the second aspect, in the frequency range where the frequency is above a certain value, the size of the HARQ feedback timing field included in the DCI (or the number of HARQ feedback timing candidates) is assumed to increase. In such a case, if the semi-static HARQ-ACK codebook is adopted, it is conceivable that the number of HARQ-ACK bits may increase to cause a throughput to decrease.

For this reason, the UE may be configured not to support the semi-static HARQ-ACK codebook in the frequency range (or at least one of the subcarrier spacing, the symbol duration, and the slot duration) where the frequency is above a certain value. In other words, the UE may adopt the dynamic HARQ-ACK codebook in a certain frequency range to control the HARQ-ACK transmission.

For example, in the case that a certain cell is configured with the first frequency range, the UE assumes that either the semi-static HARQ-ACK codebook or the dynamic HARQ-ACK codebook is configured for the certain cell through higher layer signaling.

On the other hand, in the case that a certain cell is configured with the second frequency range, the UE may assume that the semi-static HARQ-ACK codebook is not configured (or only the dynamic HARQ-ACK codebook is configured) through higher layer signaling. Alternatively, the UE may assume that the dynamic HARQ-ACK codebook is adopted without being configured through higher layer signaling.

<HARQ-ACK Bit Generation>

The UE may control generation of the HARQ-ACK on the basis of a certain condition. For example, the UE may control the generation of the HARQ-ACK bit on the basis of at least one of conditions described below. Note that the conditions below may be applied to the semi-static HARQ-ACK codebook or the dynamic HARQ-ACK codebook.

[Condition 1]

The UE may control the generation of the HARQ-ACK bit on the basis of a maximum value of the number of slots (or the UE capability for the maximum value) that can be continuously configured for the DL scheduling. For example, in a case that the number of DL schedulings that can be continuously received is in X slots, the UE may take the X slots into consideration to generate the HARQ-ACK bit to be included in the HARQ-ACK codebook (for example, the semi-static HARQ-ACK codebook). This can suppress increase in the number of HARQ-ACK bits included in the codebook.

[Condition 2]

The UE may control the generation of the HARQ-ACK bit on the basis of an HARQ process maximum number (or the maximum number of HARQ processes). For example, in a case that the maximum value of the number of HARQ-ACK processes supported is X, the UE may take the X into consideration to generate the HARQ-ACK bit to be included in the HARQ-ACK codebook (for example, the semi-static HARQ-ACK codebook). This can suppress the increase in the number of HARQ-ACK bits included in the codebook.

[Condition 3]

The UE may control the generation of the HARQ-ACK bit on the basis of a PDCCH monitoring occasion. For example, in a case that the monitoring occasion in one slot or multi-slot is configured with X or less, the UE may take the X into consideration to generate the HARQ-ACK bit to be included in the HARQ-ACK codebook (for example, the semi-static HARQ-ACK codebook). This can suppress the increase in the number of HARQ-ACK bits included in the codebook.

[Condition 4]

The UE may control the generation of the HARQ-ACK bit on the basis of presence or absence of PDCCH transmission across a slot boundary, or presence or absence of PDCCH repetition transmission across a slot boundary. For example, in a case that a PDCCH (or, PDCCH repetition) is transmitted across the slot boundary, the UE may assume that, in a plurality of slots over which the PDCCH is located, another PDCCH is not transmitted to generate the HARQ-ACK bit. The increase in the number of HARQ-ACK bits to be included in the codebook can be suppressed.

[Condition 5]

The UE may control the generation of the HARQ-ACK bit on the basis of presence or absence of PDSCH transmission across a slot boundary, or presence or absence of PDSCH repetition transmission across a slot boundary. For example, in a case that a PDSCH (or, PDSCH repetition) is transmitted across the slot boundary, the UE may assume that, in a plurality of slots over which the PDSCH is located, another PDSCH is not transmitted to generate the HARQ-ACK bit. The increase in the number of HARQ-ACK bits to be included in the codebook can be suppressed.

Others

Herein, the case of the high frequency range (for example, FR 4), the case that a certain cell (for example, PCell or PUCCH-SCell) is configured with FR 4, the case of the specific subcarrier spacing, and the case that the specific subcarrier spacing is configured for a certain cell may be interchangeably interpreted. Note that the specific subcarrier spacing may be, for example, a subcarrier spacing above 120 kHz, or a subcarrier spacing with $\mu$ being larger than 3.

FR 4 may be divided into a plurality of parts (for example, sub-frequency ranges, or sub-FRs). For example, the above aspects (for example, the configuration different from Rel. 15) may be applied to a subband above a certain frequency (for example, 52.6 GHz). Alternatively, the above aspects (for example, the configuration different from Rel. 15) may be applied to some subbands above a certain frequency (for example, 52.6 GHz), and the configuration similar to those of the existing systems (for example, Rel. 15) may be applied to other subbands.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
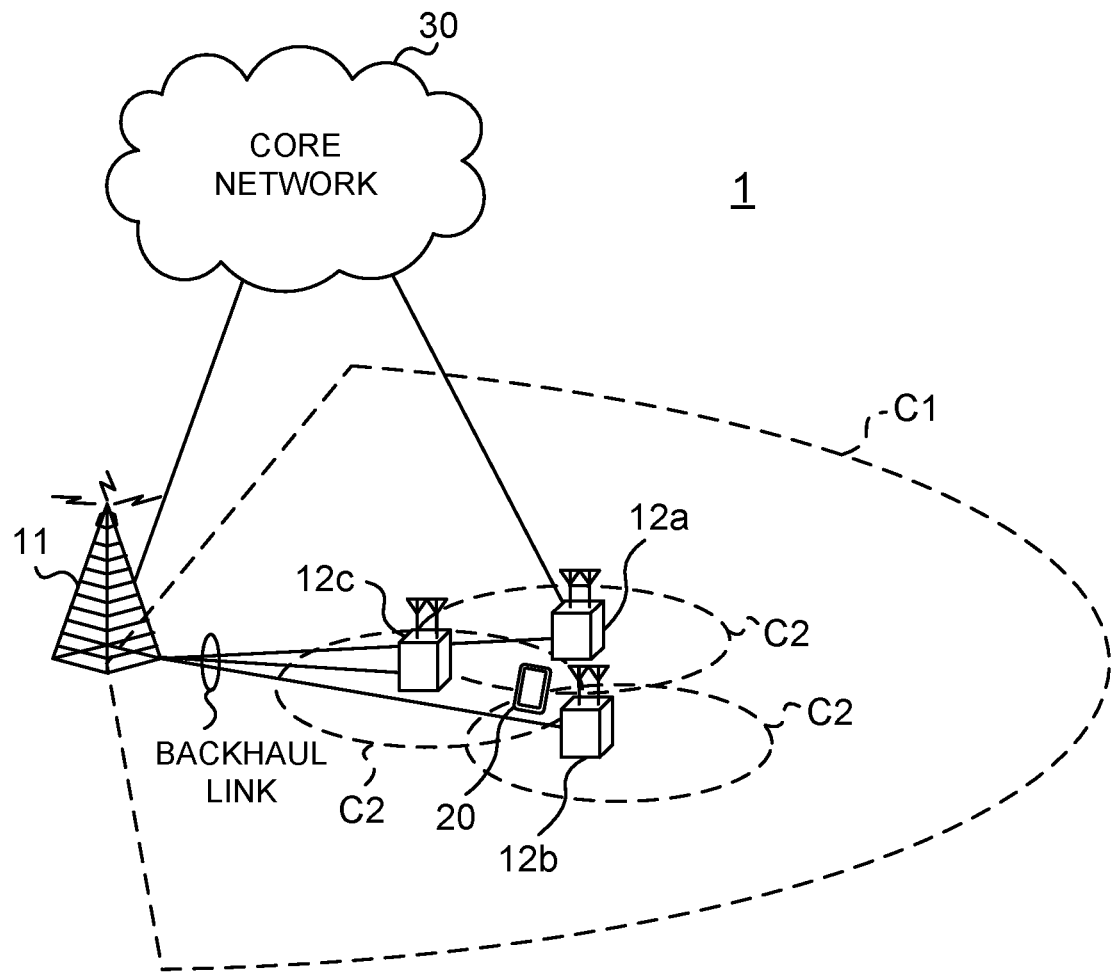
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR 1) or FR 2) and a second frequency band (Frequency Range 4 (FR 4)). The macro cell C1 may be included in FR 1 or FR 2, and the small cells C2 may be included in FR 4.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
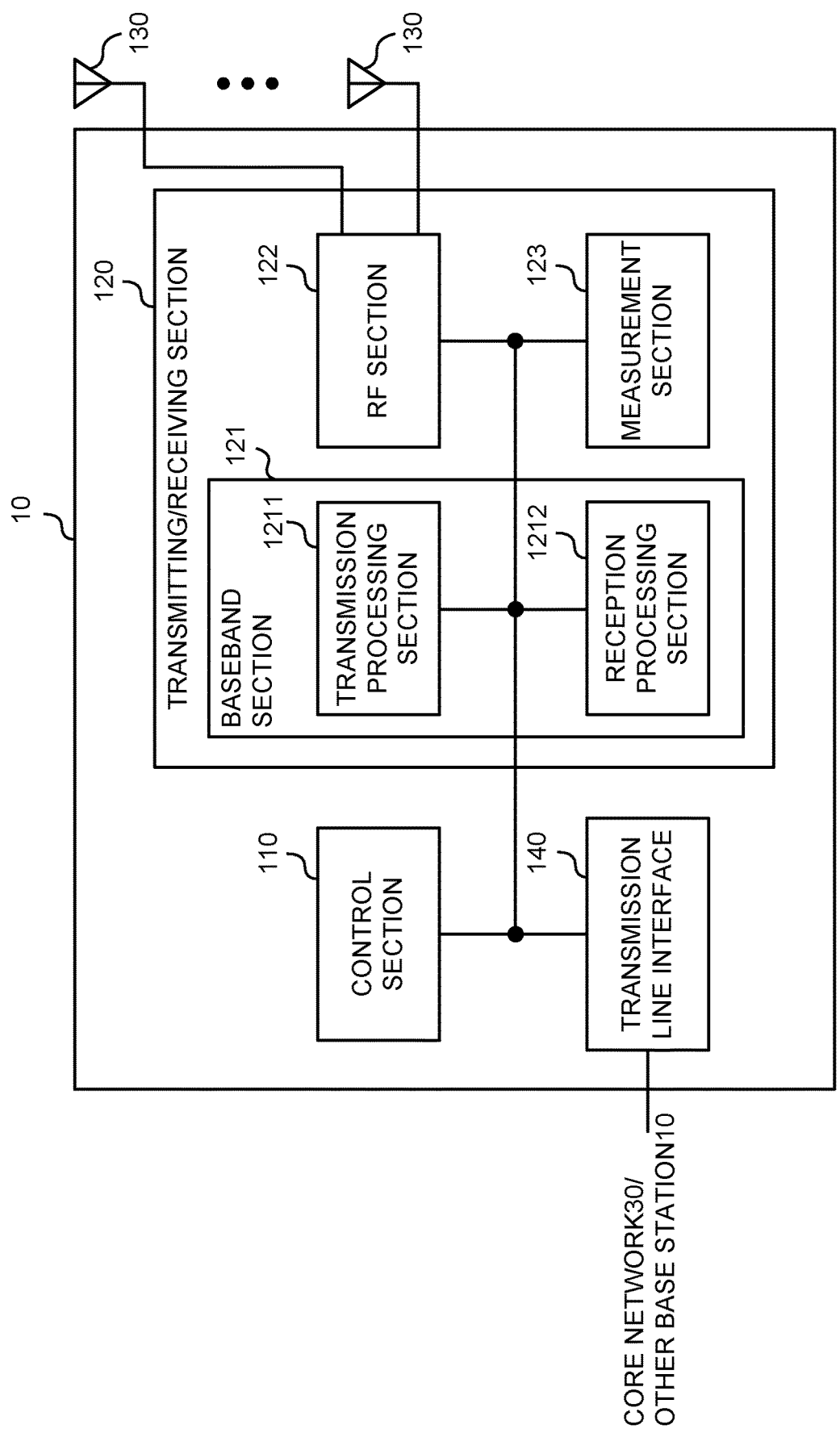
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data, control information, and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 transmits a downlink control information and a downlink shared channel scheduled by using the downlink control information. The transmitting/receiving section 120 receives a transmission confirmation signal (HARQ-ACK) responding to the downlink shared channel. The transmitting/receiving section 120 may transmit information related to a feedback timing of the HARQ-ACK responding to the downlink shared channel.

The control section 110 may control a feedback timing of transmission confirmation information responding to the downlink shared channel on the basis of information related to a feedback timing to notify at least one of the downlink control information and higher layer signaling, and a reference point configured in a slot to transmit the downlink shared channel or subsequent slots.

(User Terminal)

Figure 9:
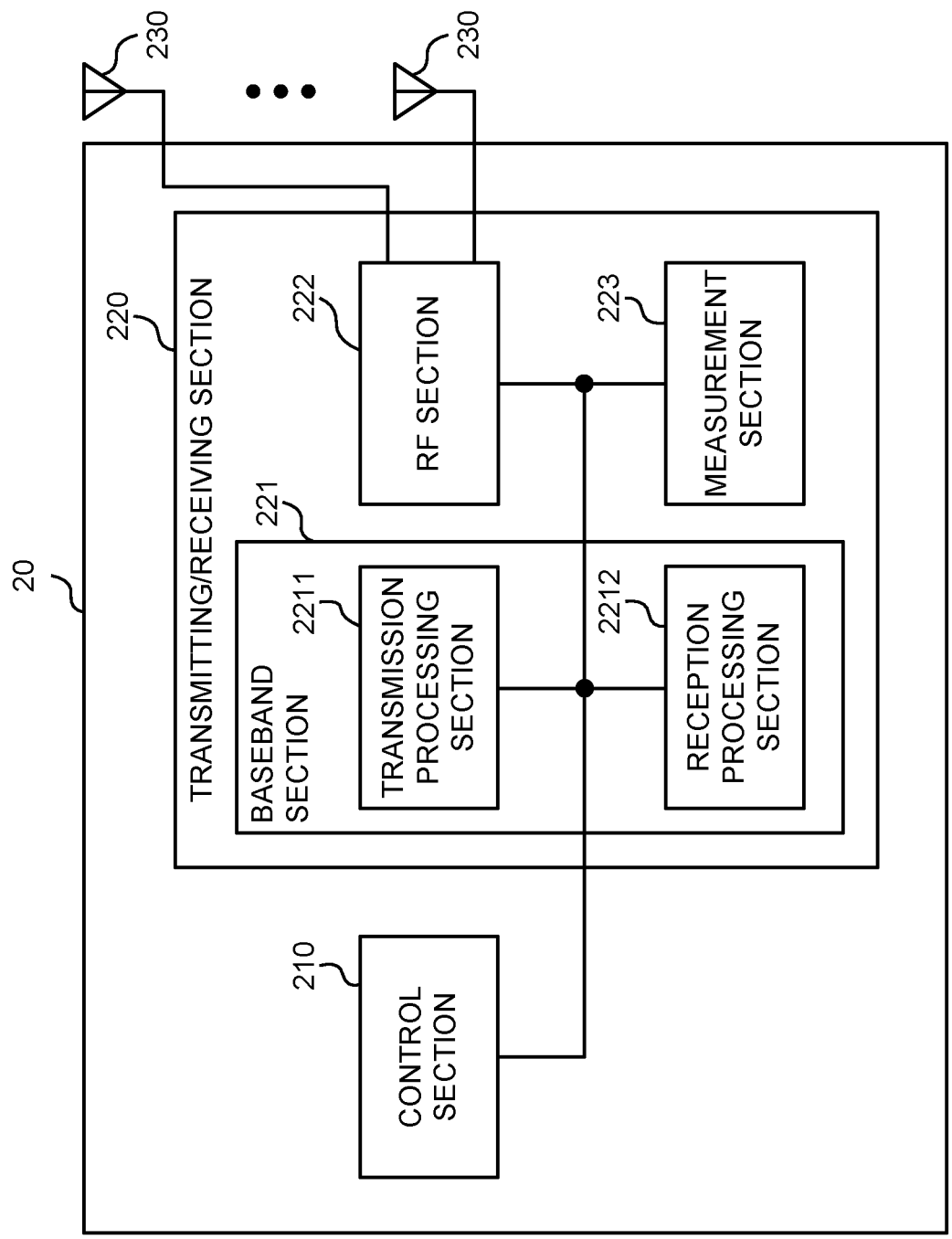
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 receives downlink control information and a downlink shared channel scheduled by using the downlink control information. The transmitting/receiving section 220 transmits transmission confirmation signal (HARQ-ACK) responding to downlink shared channel. The transmitting/receiving section 220 may receive information related to a feedback timing of the HARQ-ACK responding to the downlink shared channel.

The control section 210 may determine a feedback timing of transmission confirmation information responding to the downlink shared channel on the basis of information related to a feedback timing notified by at least one of the downlink control information and higher layer signaling, and a reference point configured in a slot where the downlink shared channel is transmitted or subsequent slots.

The control section 210 may determine the feedback timing of the transmission confirmation information on the basis of a value obtained by adding an offset to the information related to the feedback timing.

At least part of a value of the feedback timing notified by at least one of the downlink control information and the higher layer signaling may be different depending on a frequency range configured for a cell transmitting an uplink control channel.

The number of candidates for a feedback timing configured for a first frequency range by the higher layer signaling may be different from the number of candidates for a feedback timing configured for a second frequency range where frequencies are higher than the first frequency range (for example, the configurable maximum number of candidates).

The control section 210 may control so as to support semi-static retransmission control information codebook generation in the first frequency range, and not support (or not adopt) the semi-static retransmission control information codebook generation in the second frequency range where frequencies are higher than the first frequency range.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
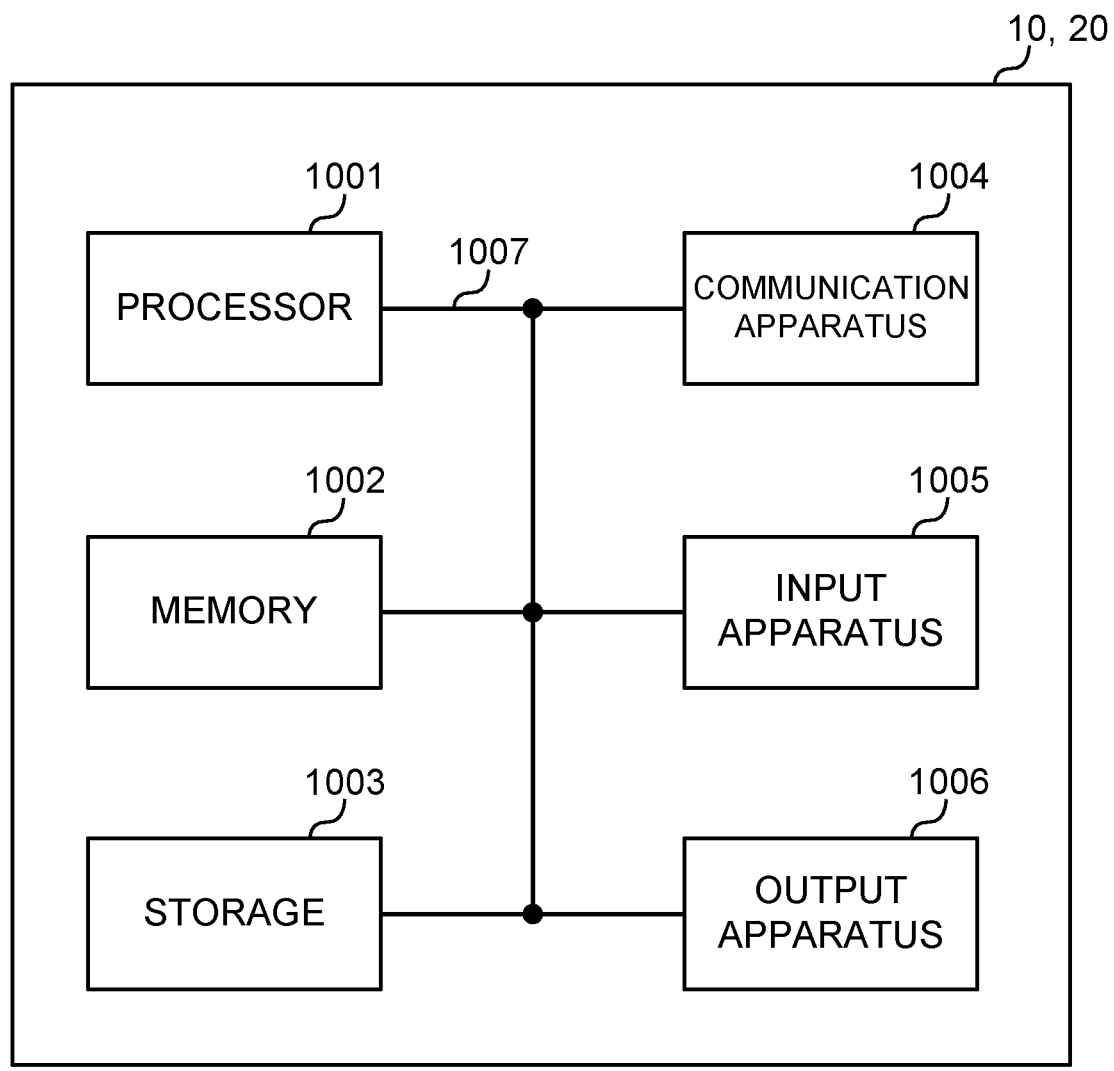
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives downlink control information (DCI) that schedules a physical downlink shared channel (PDSCH); and
   a processor that determines, based on a feedback timing value notified by the DCI, a feedback timing of a hybrid automatic repeat request-acknowledgement (HARQ-ACK) for the PDSCH,
   wherein candidates for the feedback timing value are different between a first frequency range and a second frequency range higher than the first frequency range.

2. The terminal according to claim 1, further comprising a transmitter that transmits the HARQ-ACK in the second frequency range.

3. The terminal according to claim 1, wherein the second frequency range is higher than 52.6 GHz.

4. The terminal according to claim 1, wherein a number of the candidates for the feedback timing value is different between the first frequency range and the second frequency range.

5. A radio communication method for a terminal, comprising:
   receiving downlink control information (DCI) that schedules a physical downlink shared channel (PDSCH); and
   determining, based on a feedback timing value notified by the DCI, a feedback timing of a hybrid automatic repeat request-acknowledgement (HARQ-ACK) for the PDSCH,
   wherein candidates for the feedback timing value are different between a first frequency range and a second frequency range higher than the first frequency range.

6. A base station comprising:
   a transmitter that transmits downlink control information (DCI) that schedules a physical downlink shared channel (PDSCH); and
   a processor that determines, based on a feedback timing value notified by the DCI, a feedback timing of a hybrid automatic repeat request-acknowledgement (HARQ-ACK) for the PDSCH,
   wherein candidates for the feedback timing value are different between a first frequency range and a second frequency range higher than the first frequency range.

7. A system comprising a terminal and a base station, wherein
   the terminal comprises:
      a receiver that receives downlink control information (DCI) that schedules a physical downlink shared channel (PDSCH); and
      a processor that determines, based on a feedback timing value notified by the DCI, a feedback timing of a hybrid automatic repeat request-acknowledgement (HARQ-ACK) for the PDSCH, and
   the base station comprises:
      a transmitter that transmits the DCI,
   wherein candidates for the feedback timing value are different between a first frequency range and a second frequency range higher than the first frequency range.

* * * * *